United States Patent [19]

Wright

[11] Patent Number: 4,513,984
[45] Date of Patent: Apr. 30, 1985

[54] WHEEL GEAR FOR TRAILERS
[75] Inventor: Clem B. Wright, South Fulton, Tenn.
[73] Assignee: Waymatic, Inc., Fulton, Ky.
[21] Appl. No.: 484,292
[22] Filed: Apr. 12, 1983
[51] Int. Cl.³ .............................................. B62D 61/10
[52] U.S. Cl. ................................................ 280/43.23
[58] Field of Search ................... 280/43, 43.17, 43.21, 280/43.22, 43.23

[56] References Cited
U.S. PATENT DOCUMENTS 3,285,621 11/1966 Turner, Jr. ...................... 280/43.23
3,305,876 2/1976 Hutt ................................. 280/43.23
3,362,553 1/1968 Weinmann ...................... 280/43.23

Primary Examiner—Richard A. Bertsch
Attorney, Agent, or Firm—B. P. Fishburne, Jr.

[57] ABSTRACT

A wheel suspension system for special event trailers is constructed in two opposite side laterally narrow and compact units attached to the lower perimeter frame of the trailer body. The trailer body is elevated to a transport position and lowered to a stable ground level position convenient for customers by the operation of horizontally movable cam lift plates powered by horizontal axis hydraulic cylinders in cooperation with vertical axis carriage plates having cam followers. Longitudinal leaf springs rockably mounted on the carriage plates have lost motion connections with tandem wheel axles carried by crank arms pivotally attached to the lower perimeter frame.

5 Claims, 8 Drawing Figures

WHEEL GEAR FOR TRAILERS

BACKGROUND OF THE INVENTION

Special event trailers, such as vending trailers, used for a variety of public events, require a smooth ride during transport and a solid stable support substantially at ground level during use for serving customers. Conventional wheel gear for trailers and other known vehicles fails to adequately satisfy the above needs of special event trailers and the like.

Consequently, it is the objective of this invention to provide a practical and cost-efficient wheel suspension system for trailers of the above type which allows them to be moved on a roadway at reasonable speeds with minimum vibration, bouncing and swaying and to be lowered to ground level at use destinations and solidly supported during the use of the trailer at the most convenient elevation for standing customers.

Another object of the invention is to provide a hydraulically powered vertically adjustable suspension for special event trailers in which the adjusting power cylinders do not support the weight of the trailer when the latter is in the transport or use modes, and only support such weight during the actual lifting or lowering of the trailer body relative to its wheel suspension.

Another important object of the invention is to provide an adjustable wheel suspension for trailers having leaf springs which are rockably connected to the vertical movement carriage elements of the suspension, and which have independent lost motion connections with tandem wheel spindles held on vertically swinging support arms.

Other features and advantages of the invention will become apparent during the course of the following description.

DETAILED DESCRIPTION

Figure 1:
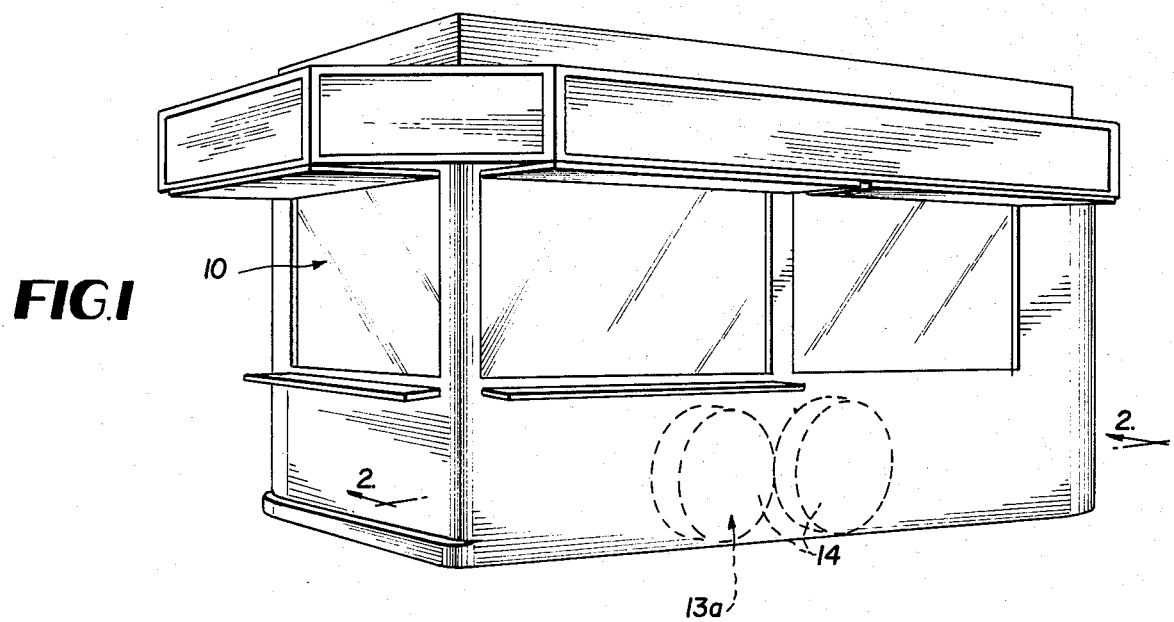
FIG. 1 is a perspective view of a special event trailer in the normal use position equipped with the adjustable wheel gear in accordance with this invention.

Referring to the drawings in detail, wherein like numerals designate like parts, a special event trailer 10, such as a vending trailer, includes a bottom horizontal perimeter frame 11 including a draft tongue 12 or other towing means. The details of the frame 11 may vary and are not important to a proper understanding of the invention.

The wheel gear or suspension for the trailer 10 forming the subject matter of the invention includes two opposite side units 13 and 13a which are operationally identical so that a detailed description of one will serve to describe both units which operate in synchronism.

Figure 3:
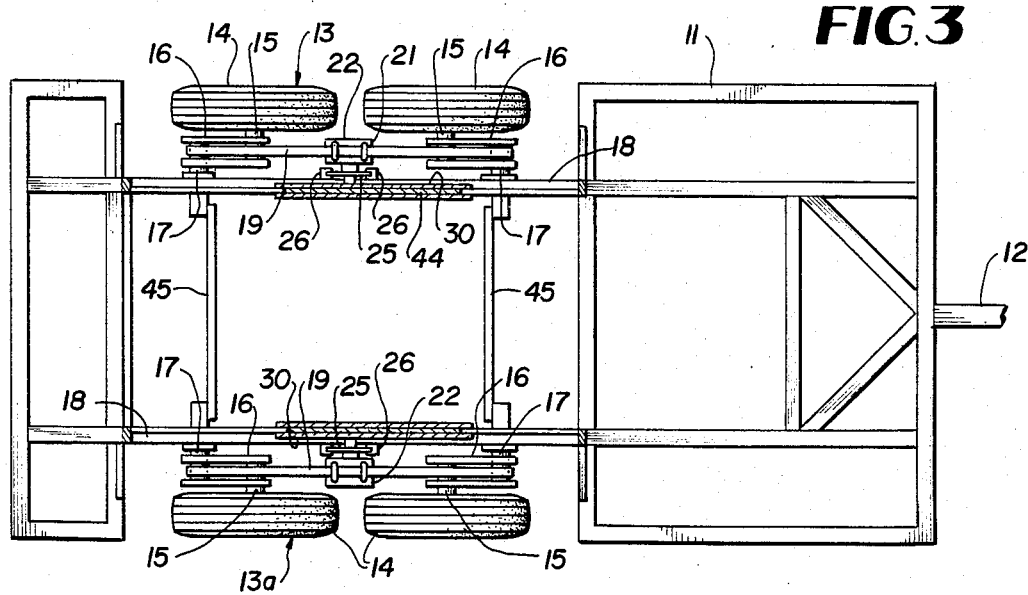
FIG. 3 is a horizontal section taken on line 3—3 of FIG. 2.

The two wheel suspension units are structurally interconnected through the unitary rigid frame 11. As best shown in FIG. 3, the two units 13 and 13a of the suspension are laterally narrow and very compact to fit into recessed opposite side portions of the trailer perimeter frame 11.

Each suspension unit 13 and 13a comprises a pair of tandem wheels 14 arranged for relative movement, as will be further explained. The wheels are rotatable on spindles 15 carried by vertically swingable crank arms 16 which are rotatable on horizontal transverse axis pivot shafts 17 fixed to longitudinal members 18 of the frame 11.

A longitudinal leaf spring 19 for each side suspension unit includes end loops 20 which slidingly embrace the wheel spindles 15 for relative movement with respect thereto in the operation of the suspension. At their centers, the leaf springs are secured by shackles 21 to rocker brackets 22 which are held on horizontal transverse axis pivot elements 23 engaged in support brackets 24, in turn rigidly mounted to the outer sides of vertical movement carriage plates 25.

Figure 5:
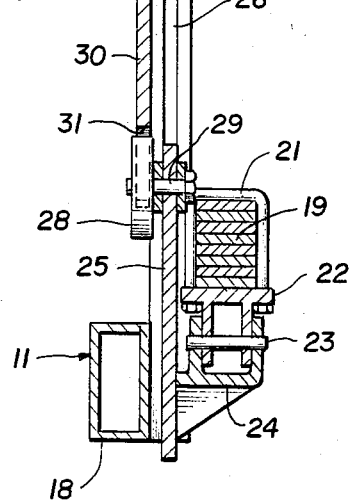
FIG. 5 is an enlarged vertical section taken on line 5—5 of FIG. 4.
Figure 6:
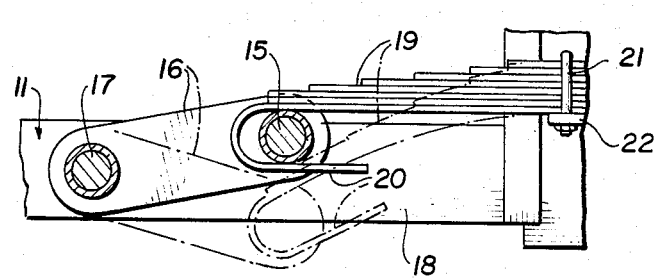
FIG. 6 is an enlarged fragmentary side elevation of a leaf spring and associated elements.

The carriage plates 25 are engaged slidably at their edges in spaced parallel vertical channel tracks 26 fixed to and rising from the adjacent frame members 18 and also connected near their tops with diagonal braces 27 anchored to frame members 18. Each carriage plate 25 on its interior side, FIG. 5, carries a follower roller 28 journaled on a short shaft 29 fixed to the carriage plate 25.

Above each follower roller 28 in a common plane therewith is a substantially flat cam lift plate 30 having an inclined lower edge portion 31 constituting a cam surface, a trailing lower horizontal edge 32 and a leading elevated horizontal edge 33. The follower roller 28 of each suspension unit 13 and 13a is adapted to engage each edge 31, 32 and 33 of the cam lift plate 30 at proper times during the operation of the suspension, as will be fully described.

Each cam lift plate 30 is propelled on a horizontal linear path by a horizontal longitudinal axis hydraulic cylinder 34, whose piston rod 35 is connected at 36 to the plate 30 near the top of the inclined edge 31. The cylinder 34 is connected at 37 to a bracket 38 on a vertical frame member 39 rising from and rigid with the trailer perimeter frame 11.

Figure 4:
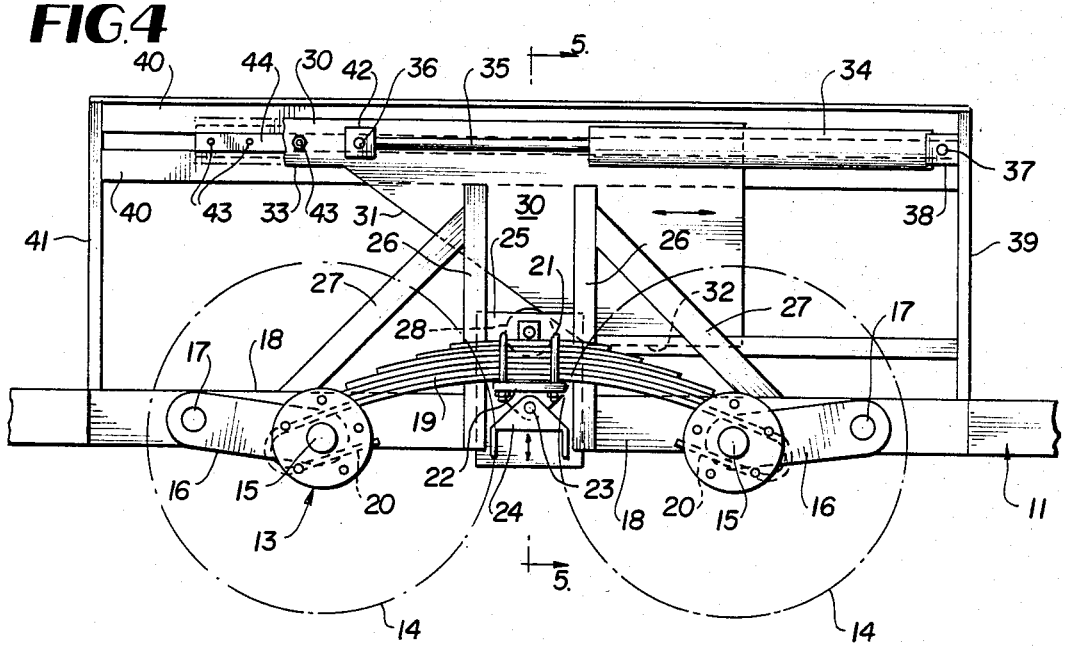
FIG. 4 is an enlarged side elevation of the wheel gear or supension in the transport mode.

A pair of spaced parallel horizontal track bars 40 for the guidance of each cam lift plate 30 are attached fixedly between the frame member 39 and a like vertical frame member 41 at the opposite ends of the bars 40, the member 41 also being fixed to the frame 11 at its bottom. The connecting element 36 for rod 35 is engaged with a bracket 42 which is secured by bolts 43 with a slide plate 44 engaged movably in the horizontal longitudinal trackway defined by the bars 40. As a consequence of this arrangement, when the rod 35 is extended and retracted, the cam lift plate 30 is moved in opposite directions on a linear path horizontally as indicated by the directional arrows in FIG. 4.

Preferably, for added strength, as shown in FIG. 3, the interior ends of shafts 17 on which the crank arms 16 are mounted are tied together across the frame 11 and between the two suspension units 13 and 13a by tie bars 45.

OPERATION

Figure 7:
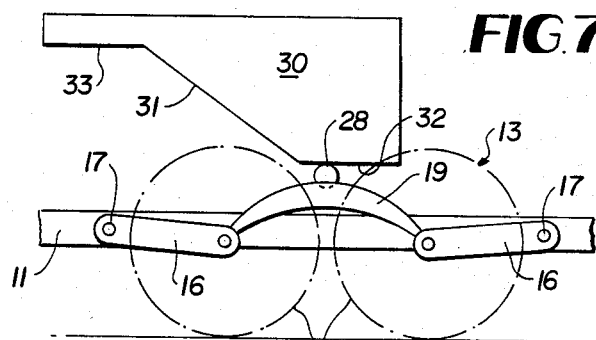
FIGS. 7 and 8 are partly schematic side elevations showing the wheel gear in the transport and stationary use modes, respectively.

In the operation of the suspension system, when it is desired to haul the trailer 10 on a roadway, the two cylinders 34 are operated simultaneously to extend the rods 35 forwardly and to correspondingly move the cam lift plates 30 in the same direction. This causes the inclined cam edges 31 of plates 30 to engage follower rollers 28 tending to depress the rollers with the carriage plate 25. However, the wheels 14, being in contact with the ground, resist such depression and the resistive force acting through follower rollers 28 lifts the two plates 30 and this, in turn, causes lifting of the slide plates 44, track bars 40, frame members 39 and 41 and the entire frame 11 including vertical channel tracks 26 and their braces 27. This, in turn, elevates the body of trailer 10 toward the transport position shown by FIG. 7. In the full transport position, the follower rollers 28 pass under the trailing horizontal edges 32 of plates 30 to support the weight of the trailer body. This weight borne by follower rollers 28 is transferred through cam lift plates 30 and slide plates 44 to the framework of the trailer. Thus, the power cylinders 34 are relieved of any weight-bearing activity during roadway transport of the trailer in the elevated position relative to the wheels 14, FIGS. 4 and 7.

Figure 2:
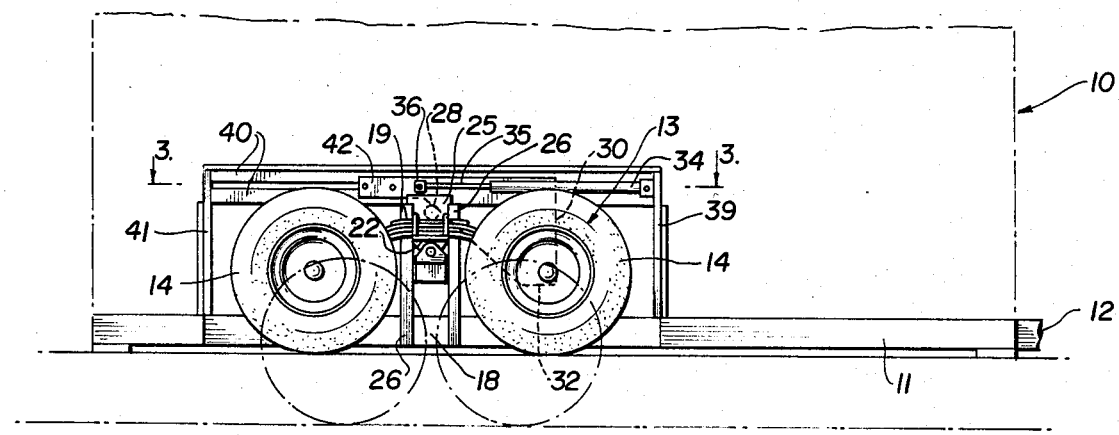
FIG. 2 is a vertical section taken on line 2—2 of FIG. 1.
Figure 8:
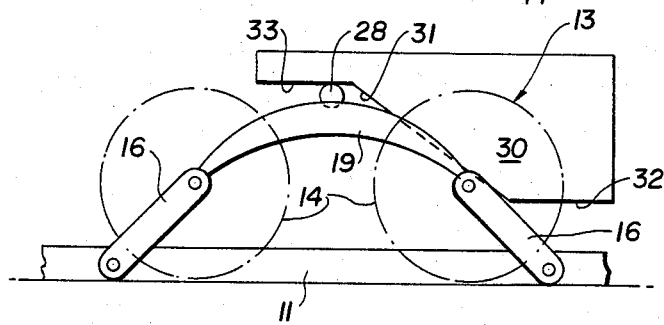

When it is required to lower the trailer 10 to a service position at a destination point, FIGS. 1, 2 and 8, the two cylinders 34 are activated to retract their rods 35 which retracts the two plates 30 horizontally. Again, with the wheels 14 on the ground and the inclined cam edges 31 moving over follower rollers 28, the plates 30 will descend with slide plates 44, track bars 40 and other associated frame parts, and the trailer body will be lowered relative to the wheels 14 toward the full down service or use position. In this use position, FIG. 8, the lower perimeter frame 11 can rest stably on the ground. The follower rollers 28 have now cleared the inclined lifting and lowering cam edges 31 and are disposed under the elevated horizontal edges 33. Again, the cylinders 34 are not required to bear the weight of the trailer, and only bear its weight in the transition period where the trailer is being raised or lowered and the rollers 28 are in engagement with inclined cam edges 31.

The mechanism is very simple, strong and positive in its action. It satisfies all of the stated objectives of the invention. The ability of the leaf springs 14 to rock on their pivots 23 and the self-adjusting lost motion connections afforded by the spring loops 20 relative to the wheel spindles 15 gives the wheels 14 full freedom of movement, promoting a soft ride and allowing the tandem wheels 14 to move together and separate, as required, in the two positions illustrated in FIGS. 7 and 8 of the drawings.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A wheel suspension for special event trailers and the like comprising a frame adapted for connection rigidly with the framework of a trailer body portion, tandem wheel crank arms on said frame adapted to swing vertically, vertical trackway means on said frame between said crank arms, guided vertical carriage means engaged with the vertical trackway means and having follower means, spring means interconnecting said carriage means and crank arms, elevated substantially horizontal trackway means on said frame, horizontally movable cam lifting means engaged guidingly with the horizontal trackway means and having an inclined edge portion and vertically spaced horizontal edge portions all engageable with said follower means, and power means connected between said frame and the cam lifting means to move the cam lifting means in opposite directions along said horizontal trackway means.

2. A wheel suspension for special event trailers and the like as defined in claim 1, and said power means comprising at least a substantially horizontal axis power cylinder.

3. A wheel suspension for special event trailers and the like as defined in claim 1, and said spring means comprising a leaf spring secured to the carriage means and extending on opposite sides of the carriage means and having a lost motion connection with said crank arms.

4. A wheel suspension for special event trailers and the like as defined in claim 3, and the lost motion connection comprising wheel spindles on the crank arms, and lost motion loops on the ends of the leaf spring embracing said spindles.

5. A wheel suspension for special event trailers and the like as defined in claim 1, and the follower means comprising a follower roller on the guided vertical carriage means.

* * * * *